US012767401B2

(12) United States Patent
Sibony

(10) Patent No.: US 12,767,401 B2
(45) Date of Patent: Oct. 20, 2026

(54) DEVICE WITH DATE ARRANGEMENT

(71) Applicant: INNOCAP LTD., Ramat Gan (IL)

(72) Inventor: Yves Sibony, Ramat Gan (IL)

(73) Assignee: INNOCAP LTD., Ramat Gan (IL)

( * ) Notice: Subject to any disclaimer, the term of this patent is extended or adjusted under 35 U.S.C. 154(b) by 137 days.

(21) Appl. No.: 18/018,193

(22) PCT Filed: Jul. 27, 2021

(86) PCT No.: PCT/IL2021/050902
§ 371 (c)(1),
(2) Date: Jan. 26, 2023

(87) PCT Pub. No.: WO2022/024116
PCT Pub. Date: Feb. 3, 2022

(65) Prior Publication Data

US 2023/0264869 A1 Aug. 24, 2023

Related U.S. Application Data

(60) Provisional application No. 63/057,903, filed on Jul. 29, 2020.

(51) Int. Cl.
*B65D 51/24* (2006.01)
*G09F 11/04* (2006.01)

(52) U.S. Cl.
CPC ............ *B65D 51/245* (2013.01); *G09F 11/04* (2013.01); *B65D 2203/10* (2013.01)

(58) Field of Classification Search
CPC .............. B65D 51/245; B65D 2203/02; B65D 2583/0409; B65D 83/0454;
(Continued)

(56) References Cited

U.S. PATENT DOCUMENTS

| | | | | | |
|---|---|---|---|---|---|
| D128,936 | S | | 8/1941 | Foley | |
| 2,365,110 | A | * | 12/1944 | Rogers ................ | B65D 47/265 222/548 |

(Continued)

FOREIGN PATENT DOCUMENTS

| | | | |
|---|---|---|---|
| CH | 715339 | A2 | 3/2020 |
| DE | 102013001579 | A1 | 7/2014 |

(Continued)

OTHER PUBLICATIONS

PCT International Search Report for International Application No. PCT/IL2021/050902, mailed Oct. 24, 2021, 5pp.

(Continued)

*Primary Examiner* — Prince Pal
(74) *Attorney, Agent, or Firm* — The Roy Gross Law Firm, LLC; Roy D. Gross

(57) ABSTRACT

A device for use with an item having an expiration date. At least when in use, the device comprises a display area, a setting means for setting at least one date at the display area, and a locking means for permanently locking the date set at the display area. The mentioned date may be related to the expiration date and for example, may be a date of opening or first use of the item, an expiration date of the item calculated after the opening or the first use, etc.

11 Claims, 9 Drawing Sheets

(58) Field of Classification Search
CPC ........... G09G 2003/0273; G09G 11/23; G09G 11/04; A61J 7/04; A61J 1/03
USPC ..... 206/534, 533, 459.1, 230; 116/309, 306, 116/308
See application file for complete search history.

(56) References Cited

U.S. PATENT DOCUMENTS

D195,734 S 7/1963 Beaumann
3,227,127 A * 1/1966 Gayle ........................ A61J 7/04 206/533
3,297,198 A * 1/1967 Wright, Jr. ................ A61J 7/04 206/534
D210,316 S 2/1968 Wolski
3,454,152 A * 7/1969 Vanderhyde ....... B65D 83/0454 206/533
3,901,407 A * 8/1975 Mitchell ................ B60K 15/04 220/326
3,921,568 A * 11/1975 Fish ......................... G07C 1/00 215/230
4,069,935 A 1/1978 Hampel
D263,805 S 4/1982 Seager
4,345,541 A * 8/1982 Villa-Real ............... G09F 11/23 206/459.1
4,365,722 A * 12/1982 Kramer ..................... A61J 7/04 206/534
4,749,093 A * 6/1988 Trick ........................ A61J 7/04 215/230
D298,512 S * 11/1988 Gotlib ......................... D3/203.4
D324,175 S 2/1992 Beck
D328,703 S * 8/1992 Klumpyan .................. D3/203.4
5,261,548 A * 11/1993 Barker ................. B65D 55/022 215/218
5,279,422 A * 1/1994 Adams ...................... A61J 7/04 215/230
5,322,166 A * 6/1994 Crowther ........... B65D 83/0454 221/277
5,377,614 A * 1/1995 Glazer .................... G09F 11/23 116/318
5,577,335 A * 11/1996 Tucker ................. A47B 23/044 215/230
D379,767 S * 6/1997 Rowley ............................ D10/2
5,678,712 A * 10/1997 Rios ..................... B65D 50/041 215/230
5,694,882 A * 12/1997 Marshall .............. B65D 51/245 116/319
6,000,159 A * 12/1999 Hornung ................. G09F 11/23 215/230
D463,281 S 9/2002 Druitt
6,779,480 B2 * 8/2004 Zamjahn ................. G09F 11/23 215/230
6,789,497 B1 * 9/2004 Aiken ..................... G09F 11/23 116/315
6,805,072 B1 * 10/2004 DeSano .................... A61J 9/00 116/308
D500,677 S 1/2005 Druitt
6,904,867 B2 * 6/2005 Zamjahn ................. G09F 11/23 141/381
7,147,127 B2 * 12/2006 Lepke ................ B65D 83/0454 221/83
D535,189 S 1/2007 Pitman et al.
7,222,736 B1 * 5/2007 Seijas ....................... A61J 7/04 116/318
7,581,640 B2 * 9/2009 Lopez .................... A47G 23/16 D7/619.1
D634,095 S 3/2011 Messner
7,975,862 B2 * 7/2011 Gnepper ................... A61J 7/04 215/230
8,020,415 B2 * 9/2011 Corbin .................... E05B 37/02 70/318
D665,163 S 8/2012 Leifeld et al.
D675,097 S 1/2013 Burke, Jr.
8,534,220 B1 * 9/2013 Olson ..................... G09F 11/23 215/230
D701,762 S 4/2014 Gortot et al.
8,689,988 B2 * 4/2014 Xu ............................ A61J 7/04 215/206
8,936,157 B1 * 1/2015 Xu ....................... B65D 47/265 220/555
8,938,999 B2 * 1/2015 Dahl .................... B65D 55/145 70/165
D781,705 S 3/2017 Hewitt
9,597,262 B2 3/2017 Morgan
D794,448 S * 8/2017 Mataya .......................... D9/436
9,758,989 B1 * 9/2017 Simpson ............. E05B 37/0058
D855,971 S * 8/2019 Moskowitz ............... A61J 7/04 D3/203.1
10,710,783 B2 * 7/2020 West .................... B65D 51/245
D917,154 S 4/2021 Zhu
11,147,742 B1 * 10/2021 Omokhodion ..... B65D 83/0454
D936,961 S * 11/2021 Northern ..................... D3/203.1
11,208,241 B1 * 12/2021 Gillman ............. B65D 51/2842
D999,061 S * 9/2023 Siboni ............................ D9/447
11,873,146 B1 * 1/2024 Gonzalez ........... B65D 83/0409
12,055,897 B2 * 8/2024 Maier ................ G04B 19/2534
2003/0222045 A1 * 12/2003 Shane ....................... A61J 7/04 215/230
2005/0258053 A1 11/2005 Sieg
2006/0207958 A1 * 9/2006 Hamer ................ E05B 73/0041 215/206
2007/0056503 A1 * 3/2007 Sollaccio ................ G09F 11/23 116/308
2007/0261985 A1 * 11/2007 Allen ........................ A61J 7/04 206/538
2008/0000791 A1 * 1/2008 Strong ..................... G01D 7/00 206/459.1
2008/0066504 A1 * 3/2008 Matsushita ............ B65D 63/10 70/58
2008/0245796 A1 * 10/2008 Gnepper .............. B65D 47/265 220/281
2008/0251531 A1 * 10/2008 Coe .................... B65D 83/0454 221/265
2008/0302794 A1 * 12/2008 Wagner ................ B65D 55/145 220/210
2009/0045224 A1 2/2009 Faaborg et al.
2009/0090688 A1 * 4/2009 Fruchter .............. B65D 51/245 493/162
2009/0095645 A1 * 4/2009 Lopez .................... A47G 23/16 206/217
2011/0049080 A1 * 3/2011 Simpson ................ B65D 43/16 29/428
2011/0067623 A1 3/2011 Fagan
2011/0079058 A1 * 4/2011 Nielsen ................. A61J 1/1437 70/158
2011/0210136 A1 * 9/2011 Wang ................... B65D 55/145 220/831
2012/0103849 A1 * 5/2012 Rachuk ..................... G09F 9/00 206/459.1
2012/0257478 A1 * 10/2012 Marcellino ............. G04F 10/00 368/10
2013/0121621 A1 * 5/2013 Misner .................... E05B 37/02 383/42
2013/0341298 A1 * 12/2013 Jones, III ............... B65D 50/06 215/206
2014/0008319 A1 * 1/2014 Buxton-Dakides ....... A61J 1/03 215/230
2014/0299504 A1 * 10/2014 Sena ......................... A61J 1/03 206/534
2014/0332494 A1 * 11/2014 Balakier .............. B65D 1/0246 215/365
2014/0374301 A1 * 12/2014 West ......................... G09F 9/00 206/459.5
2017/0004335 A1 1/2017 Russell et al.
2018/0178955 A1 * 6/2018 West .................... B65D 51/245
2018/0318174 A1 * 11/2018 Gosselin ................... A61J 7/04
2019/0271954 A1 * 9/2019 Silvant ................... G04G 21/04

(56) References Cited

U.S. PATENT DOCUMENTS

| | | | | |
|---|---|---|---|---|
| 2020/0264564 | A1* | 8/2020 | Braun | G04B 19/25353 |
| 2020/0299039 | A1* | 9/2020 | West | B65D 51/245 |
| 2023/0264869 | A1* | 8/2023 | Sibony | G09F 11/23 220/212 |

FOREIGN PATENT DOCUMENTS

| | | | |
|---|---|---|---|
| JP | 3129455 | U | 2/2007 |
| RU | 90700 | U1 | 1/2010 |
| WO | 2007110009 | A1 | 10/2007 |
| WO | 2017037665 | A1 | 3/2017 |

OTHER PUBLICATIONS

PCT Written Opinion for International Application No. PCT/IL2021/050902, mailed Oct. 24, 2021, 7pp.

PCT International Preliminary Report on Patentability for International Application No. PCT/IL2021/050902, issued Jan. 31, 2023, 8pp.

Price, Betsy (2021). Delaware men create pill bottle cap that uses thumbprint to open. Town Square Live, Available online: [https://townsquaredelaware.com/delaware-men-create-pill-bottle-cap-that-uses-thumbprint-to-open/].

Amazon.com, TimerCap, "TimerCap Automatically Displays Time Since Last Opened—Built-in Stopwatch Smart Pill Bottle Cap Medication Reminder Case (2 Pack—Large 4oz Amber Bottles) EZ-Twist/CRC". Retrieved Oct. 26, 2022 from: [https://www.amazon.com/TimerCap-Automatically-Displays-Opened-BuilUdp/BOOECK8KFG].

Amazon.com, e-pill Medication Reminders, "e-Pill TimeCap and Bottle—Last Opened Time Stamp—Set Up to 24 Alarms Per Day—Easy to Use". Retrieved Oct. 26, 2022 from: [https://www.amazon.com/Pill-TimeCap-Bottle- Replaceable-Battery /d p/B004 WBE QC4].

* cited by examiner

DEVICE WITH DATE ARRANGEMENT

CROSS REFERENCE TO RELATED APPLICATIONS

This application is a National Phase of PCT Patent Application No. PCT/IL2021/050902 having International filing date of Jul. 27, 2021, which claims the benefit of priority of U.S. Provisional Patent Application No. 63/057,903, filed Jul. 29, 2020, the contents of which are all incorporated herein by reference in their entirety.

FIELD OF THE INVENTION

The invention relates to a device comprising an arrangement for setting a date. More specifically, the invention disclosed herein relates to a device for use with a container intended for storing various materials, which device comprises a date setting arrangement.

BACKGROUND OF THE INVENTION

Expiration date of a material stored in a specific item (or of the item itself) is the important information one should pay attention to before consuming such a material (or using the item), especially in those cases when the expiration date depends on the opening date of the item.

The mentioned item may relate to containers comprising materials such as medications, nutrition products, food, drinks, beauty products, cosmetics, colors, paints or the like.

However, the item may belong to a variety of assemblies in which the expiration date affects their operation, for example the item may be a water filter.

In this patent application, for the sake of simplicity, the device of interest will be presented and discussed using a representative but not limiting example, namely as a device intended for use with containers storing a medication.

Expiration date indicates the date at which the medication is meant to become no longer effective or even unsafe to use. This date is important for drug manufacturers, since correct indication of it allows properly informing the customer when the product is safe and effective to use.

Usually, the expiration date depends on the manufacturing date and is just stamped by the manufacturer on the container. However, sometimes the expiration date depends on the opening date of the container. This may be caused by a specific character of the material stored in the container (for example, liquid medications, pills, ointments, therapeutic lotions, etc.) Once the original medication container is opened, the medication is exposed to various environmental factors (such as, temperature, light, humidity, etc.,) that affect the expiration date, so from that point in time the expiration date should be calculated as suggested by the manufacturer, usually for several months thereafter.

Typically, a consumer does not recall when the medication container was actually opened. Due to that, the consumer may be unaware whether the medication is already expired or not. The outcome of taking an out-of-date medication may in some cases be a fatal mistake. This problem is even more critical when it comes to children's medications or medications for elders for example, as their health is much more vulnerable.

To overcome the problem of keeping track to various dates important for a medication, many manufacturers developed a variety of smart caps that can be attached to an existing cap of a medication container. For example, a smart cap may be capable of establishing a wireless connection to a smartphone application to keep track of the medication adherence, opening date, expiration date and so on. Such a solution is quite expensive to develop and to manufacture, resulting in significantly increasing the cost of the shelf product for the end consumer. There is no justification to use such an expensive solution for rarely or irregularly taken medications, such as those used to treat fever and headaches. Another point is that such a solution requires interaction with a cellphone or the like, which may be a problem for a specific clientele.

There are other prior art solutions, some of them use mechanical means for indication of an expiry date. For example, DE102013001579(A1) describes a method for identification of durability of a product stored in a beverage bottle subjected to expiry, for managing and monitoring an expiration date after the first-time opening of the bottle.

OBJECT AND SUMMARY OF THE INVENTION

There is a need for an economical solution which would enable a user to easily monitor the expiration date of a material/device. The solution has to ensure that the user takes the medication that is proven to be safe and effective, without putting the user's health at risk.

According to one aspect of the invention, there is provided a device for use with an item having an expiration date; the device, at least when in use, comprising:

a front face configured to face a user, a rear face opposite thereto, a peripheral side wall therebetween, a display area, at least one dial being accessible to the user for applying a force thereto;

wherein one of the display area and said at least one dial having icons thereon facing in the direction of the front face, while the other one comprising at least one pointer, the display area and said at least one dial being movable relatively to each other when said force is applied to the dial, so as to bring the icons into a position where at least one icon is pointed to by said at least one pointer, said position being indicative of a date of interest depending on said expiration date, the device also comprising at least one locking element operable to permanently lock the at least one dial in place thereby permanently preventing the movement thereof.

The movement may be understood as a rotating motion or as a sliding motion between the dial and the display area.

The dial/s may be, for example, in the form of rotatable disc/s, in the form of tapes movable/slidable on pulleys, in the form of slidable plates etc. with the icons facing the display area. In this case the display area may be configured to comprise one or more orifices/windows/frames/pointers/clock hands or the like.

Alternatively, the movable dial/s may comprise rotatable clock hand/s, slidable frame/s or other movable pointer/s, while the display area may be static and may have the icons to be pointed to.

The display area may be provided, for example, at the static front face or in proximity to it.

There is an option when the disc/s (being rotatable dial/s or a static display area) may form part of the front face.

In one specific embodiment of the invention, said at least one dial may be disposed between the front face and the rear face of the device, the display area may be configured to display at least one icon thereat, the icons may be provided on said at least one dial facing in the direction of the display area, and said at least one dial is movable when the force is applied thereto so as to bring the icons into said position with respect to (or at) said display area.

In the above-mentioned specific embodiment, there is provided a device for use with an item having an expiration date; the device, at least when in use, comprising:

a front face configured to face a user, a rear face opposite thereto, and a peripheral side wall therebetween;

a display area configured to display at least one icon thereat;

at least one dial disposed between the front face and the rear face of the device, having icons thereon facing in the direction of the display area and movable when a force is applied thereto so as to bring the icons successively into a position at said display area, the dial being accessible to the user for applying said force thereto; and at least one locking element operable to permanently lock the at least one dial in place thereby permanently preventing the movement thereof.

The device may be intended for managing and monitoring, by the user, of the so-called date of interest which depends on the expiration date.

The at least one icon displayed at the display area upon bringing it into the desired position relative to the dial, will indicate the date of interest.

The term "date of interest" may be understood at least in the following three meanings: as an expiration date stated by the manufacturer of the item, as a date of opening the item, as a date of expiration after the opening.

The date of interest may be set by the user on the device by moving and locking said at least one dial at a desired position relative to a display area.

The term "dial", in the above-mentioned specific embodiment, should be understood as a movable part of the device that shows the icons serving for indication of respective elements of the date of interest. The dial is moved in order to control it. The dial may comprise a plate, a disk, a face, or other element (for example a movable tape, a pulley), and in this embodiment has the icons/digits on it, upon which the time/date can be indicated.

The term "display area", in this specific embodiment, may be understood as an area comprising one or more static pointers, for example windows/frames/openings/arrows etc. provided at the front face. The icons on the movable dial/s may be brought into the mentioned position in front of the static pointer/s.

More specifically, said at least one dial may be in the form of a disc rotatable when the force is applied thereto by the user, and the term "movement" may be understood as rotation of said at least one dial relative to the display area.

Alternatively, indication of the date of interest may be performed using a relative position of a dial with respect to a display area. The dial, for example, may have the form of a clock-hand and the display area may be provided with the icons.

Yet alternatively in the description, indication of the date of interest may be done using digital display/s as a display area. In general, a setting means may be used in cooperation with any display area. The setting means may be electronic (for example, buttons or switches) or mechanic (for example, dials, pointers, clock-hands).

In one embodiment, the device may be configured for use with the item which is a container holding inside a product having the expiration date. The expiration date May be stated by the product's manufacturer but may be calculated from the date of opening the container. The user may therefore determine and set the relevant date of interest on the device.

In another embodiment of the device, the item may be an assembly/an apparatus (for example, a water filter) for which the expiration date is calculated after opening/initiating the assembly. For example, the user may select the date of interest by calculating a predetermined period from the date of opening the water filer. An additional option of the date of interest may be a date of service, it may be selected by the user a bit before the expiration date.

The "device" may be separate from the item, may be engageable/attachable to the item, or may form integral part of the item.

In a further specific embodiment, the device is a cap or a cap cover that may be designed and produced to suit any existing container (or any existing cap). In this embodiment, the cap is designed to allow quite simple setting on it the date of interest and ensuring that the setting remains unchanged. The proposed cap is quite simple and inexpensive in production.

In the device, the mentioned at least one locking element has an unlocking position, at which said at least one dial is allowed to move (rotate), and a locking position, at which at least a portion of said at least one locking element engages the at least one dial so as to permanently prevent the movement (rotation) thereof.

The mentioned locking element may be movable from the unlocking position to the locking position by applying force thereto by the user at least indirectly.

The mentioned locking element may be permanently securable to the item (say, container) or another element of the device in the locking position.

When the device is in the unlocking position of the at least one locking element, at least a portion thereof may protrude outwardly from the front face or the side wall of the device.

When the device is in the locking position of the at least one locking element, an exterior surface thereof may be disposed within boundaries of a footprint of the device.

In the proposed device, the mentioned at least one dial may be in the form of a disc and may have grooves configured to receive at least a portion of said at least one locking element therein so as to engage said at least a portion of said at least one locking element to prevent the at least one dial from rotating.

In the proposed device, said front face may have a stationary portion and at least one movable portion in the form of at least one cover, said at least one cover may have an open position and a closed position, such that its open position enables access to the at least one dial and/or to the at least one locking element and its closed position prevents access to the at least one dial and/or the at least one locking element.

In its closed position, said at least one cover may be permanently securable to the item (say, a container) or to another element of the device.

According to another aspect of the invention, the proposed device may be defined from a different angle. While the first version of the device focuses on its ability to permanently lock the dial(s) in order to preserve the performed setting of a date, the next version of the device is focused on its ability to provide access to said dials(s) when a user wishes to set the date of interest:

A device for use with an item having an expiration date, the device comprising:

- a front face having a stationary portion and at least one movable portion in the form of at least one cover, both said portions being configured to face a user;
- a rear face opposite to the front face;
- a peripheral side wall between the front and rear faces;
- a display area constituting a part of the stationary portion or the at least one movable portion of the front face and/or the peripheral side wall, configured to display at least one icon thereat; and
- at least one dial disposed between the front face and the rear face of the at least one portion having icons thereon facing in the direction of the display area and movable when a force is applied thereto so as to bring the icons successively into a position at said display area, the dial being accessible to the user for applying said force thereto;
- said at least one cover having an open position enabling access to the at least one dial and a closed position preventing the access to the at least one dial.

As the previously defined device, this version also allows managing and monitoring, by the user, of a so-called date of interest which depends on the expiration date. The icons displayed at the display area upon bringing the dial/s into the position are supposed to indicate the date of interest.

The at least one dial may be a disc rotatable when the force is applied thereto.

The item mentioned above may be a container intended for storing a product having the expiration date.

The peripheral side wall between the front and rear faces may be circumferential.

The mentioned said at least one cover may be permanently securable to the item (container) or permanently secured to another element of the device.

The mentioned at least one cover may be movable from the open position to the closed position by applying force thereto by the user, at least indirectly.

The device may further comprise at least one locking element configured for permanently locking the at least one dial in place, thereby permanently preventing the movement (say, rotation) thereof.

When the at least one cover of the device is in the closed position, an exterior surface of the cover may be disposed within boundaries of a footprint of the device.

The said at least one cover may be pivotally attached to another element of the device. Alternatively, the mentioned cover may be slidably attachable to the container or to another element of the device.

Any of the above-defined embodiments of the proposed device may also have the following characteristic features:

- The device may be integrated within a cap configured for engaging the container.
- The device may constitute a part of the container.
- The display area of the device may enable the at least one icon to be seen distinctly from other icons.
- The dial may constitute a first dial and said icon thereon may constitute first icons. Further, said at least one dial may comprise the first dial and at least one second dial having second icons thereon. Still further, said display may be configured for presenting simultaneously at least one of the first icons and at least one of the second icons.
- The first dial may define a first plane, and the second dial may define a second plane different from the first plane.
- The first plane may be parallel to the second plane. There is also an option that the two dials lay in one plane.
- The icons are indicative of a date. The display area of the device is adapted to indicate the date of interest. For more reliable indication and perception of the indication, the display area or the front face of the device may additionally be provided with at least one written mark for explaining the meaning of the icons appearing at the display area.

In other embodiments of the invention, the device with date arrangement may be designed in the shape of an analog watch comprising at least two adjustable hands, that may be shifted manually and serve as dials and pointers. A clock face may comprise one or more rings/discs with a plurality of digits to which the clock hands may be brought to point respective elements of the date.

Alternatively, the clock hands may be stationary and serve as stationary pointers, while the clock face may be formed as several concentric rotatable discs/rings which will then serve as dials.

In the above embodiment, one hand may point on a number representing the day, the second-on a number representing the month, and optionally a third hand may point on a number representing the year.

In other embodiments of the invention, the date arrangement may comprise at least one digital display (serving as the display area), for displaying either the opening date or the expiration date or both of them. In such a configuration, the date arrangement may further comprise an energy source and at least one button/switch or any other suitable tuning element that may be used for the purpose of setting the date. The date set on the digital display(s) may further be permanently locked using the same at least one button/switch, for example by applying a long press thereto. Alternatively or in addition, an additional upper transparent lid may be mounted on the arrangement after setting the date, so as to permanently block access to the button(s)/switch(es).

According to a further aspect of the invention, the proposed device may be defined as a device (for example, in the form of a cap/cap cover) for use with an item having an expiry date (for example, a container storing a product having that expiry date); the device comprises:

- a display area,
- setting means for setting at least one date using the display area, and
- locking means for permanently locking said at least one date upon being set,
- wherein said at least one date being selected from a non-exhaustive list comprising: a date of first use of the item (say, a date of opening the container) and an expiration date of the item after said first use.

Further, there is also provided a container comprising the above-described device. The container may be manufactured integrally with the proposed device.

Still further, the device (or, in case the device is integral with an item, the item itself) may be used with an RFID (Radio Frequency Identification) circuit comprising an RFID tag having its ID and configured to provide a dedicated information on the item having said expiration date. More specifically, said dedicated information may comprise at least indication of the specific product intended to be stored in the item (container) and having its specific expiration date.

The RFID (Radio Frequency Identification) circuit may be implemented as an NFC (Near Field Communication) circuit.

According to a further aspect of the invention, there is provided an RFID tag for use with a container storing a product having an expiration date, said tag having ID and being configured to provide information indicative of (dedicated to) said product.

Such RFID tags may be manufactured for monitoring the expiration date of a specific product, and may be installed on the containers/caps of the containers storing that product.

The tags may be installed by the manufacturer of the containers/caps. However, users may also perform the installation, for example if they buy a kit comprising the RFID tag and the container storing said product.

For obtaining the information stored in the RFID tag, the customer utilizes an RFID reader adapted to be in communication with the RFID tag; the RFID reader may form part, for example, of a mobile device such as a smartphone. The obtained information should be stored in a data base of the RFID circuit, for example on a server adapted to be in communication with the RFID reader.

More specifically, the RFID circuit may comprise:

an RFID reader (for example, a smartphone having NFC functionality);

a remote server in communication with the RFID reader; the server may be configured to receive data on the RFID tag from the RFID reader, to run a software script (program) for processing the data received from said RFID reader, creating a website/URL associated with the RFID tag and sharing info about said website/URL with a user (and/or with a third party—for advertising, statistics, scientific research, etc.);

wherein said website/URL being designed to store at least one date of interest related to said RFID tag.

For products having an expiration date, said at least one date of interest may be selected from a non-exhaustive list comprising a date of opening the container, a date of expiration of the product stored in the container after opening the container.

We keep in mind that at least one date of interest may be set by the user on the display area of the device which is described in the present application.

According to yet a further aspect of the invention, there may be provided a method for monitoring a date of interest in respect of an item constituted or engageable by the at least one portion of the above-described device (having the display area), the method may comprise:

providing an RFID circuit comprising an RFID tag having at least its dedicated information including the tag ID and, optionally, indication of the item (say, a product in the container), the tag being installed on the device or on the item;

setting the date of interest using the display area of the device, registering, within the RFID circuit, the set date of interest in one-to one connection with the dedicated information associated with said RFID tag.

For example, the date may be set at the display area and may be a date of first use of the item (for example, the date of opening the container), etc.

The method may further comprise a step of sharing the registered data (say, with a user and/or a third party), for example by sending the mentioned URL from the server to the user's electronic calendar. The calendar may be implemented as a software application in the user's computer, for example in a mobile device.

In case the item is an assembly/apparatus with some expiration date (say, a service date for a water filter, an air conditioner in which freon should be timely refilled, a car which should timely pass a test, etc.), the date of first use of the item may be the date of its installation, of its previous service, etc. The RFID circuit may be configured to store one or more additional dates of interest. For example, the additional date may be indicative of a reminder before the expiration date (for service of the item, for purchasing a new item, etc.)

BRIEF DESCRIPTION OF THE DRAWINGS

The invention will be further described using a number of exemplary embodiments and with reference to the accompanying non-limiting drawings, in which.

DETAILED DESCRIPTION OF SPECIFIC EMBODIMENTS

Figure 1:
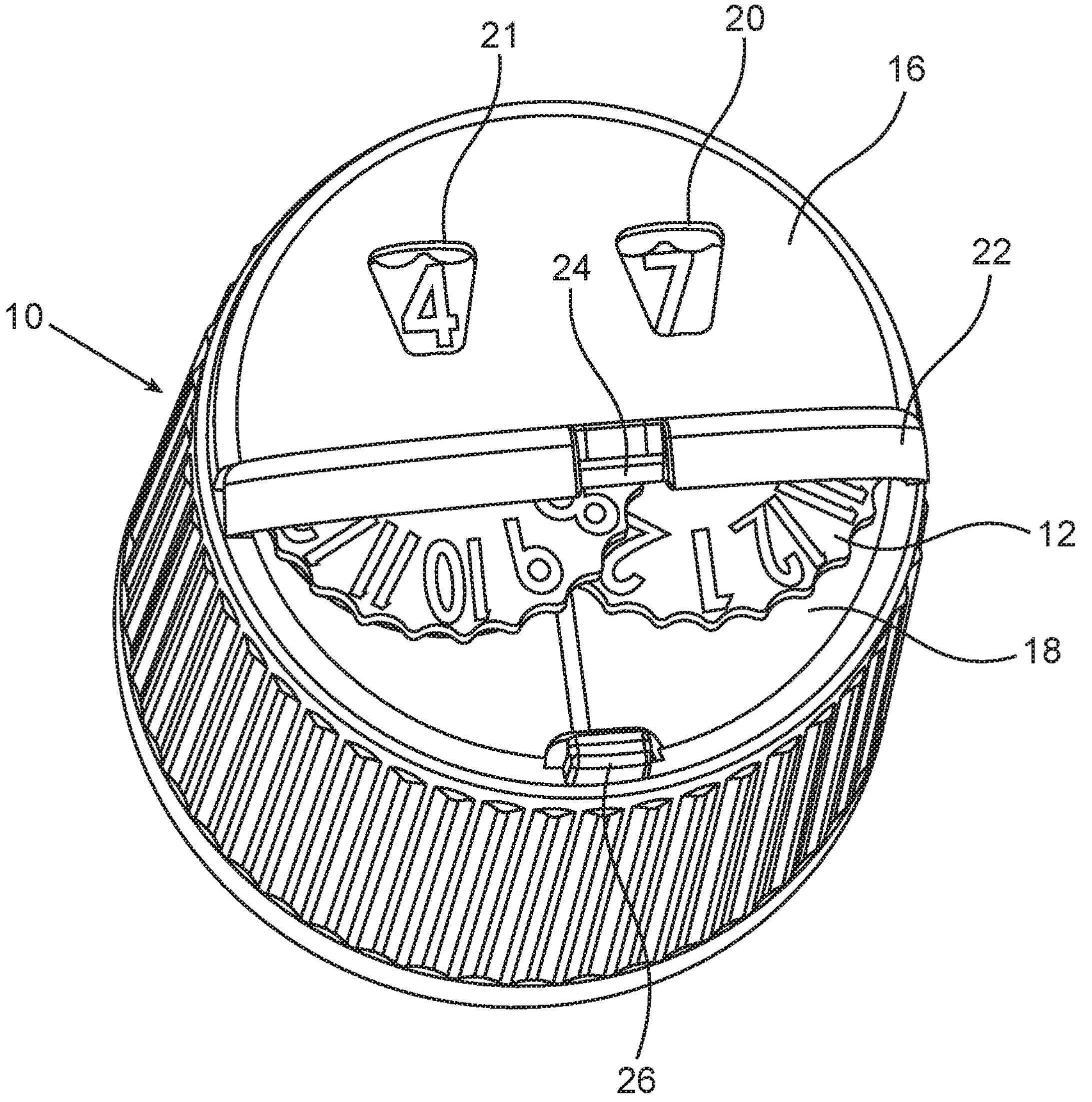
FIG. 1 is a perspective view of the device according to one exemplary embodiment of the proposed device.

The invention relates to a device having an arrangement for setting at least one date of interest and enabling to monitor that at least one date. The date of interest is related to an expiration date of the item to which the device is intended.

The device may be, for example, in the form of a cap designed for the item in the form of a container or a bottle (storing a product having an expiration date).

In another example, the device may be in the form of a cap cover which is configured to be tightly coupled on a standard cap of a container for storing such a product.

Alternative items (for example, water filters with an expiration date) may exist, and they may be provided with the alternative device which will allow monitoring the expiration date. The alternative device may have any arbitrary shape.

The date of interest may be equal to the expiration date stated for the product/item, but may differ from it. For example, it may be calculated based on the date of opening (de-hermitizing) the container, the filter, etc.

For illustrating the principles of the invention, the "cap" example will be used as a basic (though not limiting one) in the description and the drawings. It should be emphasized that the cap example shown in the drawings illustrates both the cap implementation, and the cap cover implementation, since they may be similar in shape and may differ from one another only by dimensions and by securing means (for engaging the device either with an item or with a cap). In view of the above, both in the description and in the drawings, the device shaped as a cap should be understood as representing also the "cap cover" option.

The inventive cap may be designed to suit an existing medication container and to replace its original cap. In certain circumstances the invention may constitute a cap cover that is especially suited for use with an existing medication container cap. The cap or the cap cover comprises a date arrangement allowing a consumer to set one or more dates of interest. The user may select which date to set: the expiration date of the medication, the opening date of the medication container and/or the expiration date of such medication based on the opening date, according to the manufacturer's instructions. This is to allow the consumer to verify that the medication stored therein did not became expired and it is safe and effective for use. The functional design of the cap/cap cover makes it easy to use. Moreover, the cap and/or the cap cover is inexpensive to manufacture.

In some embodiments of the invention, the cap is manufactured for an existing medication container according to the manufacturer's specifications as a complete unit. FIGS. 1, 2, 3, 4 show such a unit. However, in other embodiments of the invention (which are not illustrated separately), the device may be manufactured as a cap cover configured to be coupled with an existing medication container cap. Therefore, unless otherwise stated, the term "cap" as used herein in this disclosure is intended to refer both to a "cap" as well as to a "cap cover", covering both options of manufacturing of the invention.

As said, the cap is configured to be compatible to an existing medication container or to be coupled with an existing cap of a medication container as a cap cover. Therefore, in both cases the shape of the cap fits to the size and measurements of the original medication container cap-either if designed to replace it or to cover it. The manufacturer of the medication containers and caps is not required to change or modify its production line. The cap is designed to be compatible to an existing medication container. Therefore, the shape and size of the cap varies depending on the shape and size of the target medication container, and may have any shape such as oval, square, circular, etc. but yet should be compatible in its shape and dimensions to the target medication container. The figures disclosed herein illustrate only optional embodiments of the device design disclosed herein, and other designs may apply as well.

The embodiments described and illustrated in this patent application are optional. However, other designs of the date arrangement and the locking elements are applicable as well.

The cap may be formed of any material that is suitable for the corresponding industry (drugs, food, beverages, paints, etc.). Suited materials include plastic polymers, and others.

In some embodiments of the invention, the cap may be recycled or discarded after the use or may be reused later any number of times on other containers of the same kind or on other compatible containers.

In summary, the cap of the invention is inexpensive to manufacture, since it has a small number of components. The cap overcomes disadvantages of the existing solutions such as smart caps, which tend to be expensive to manufacture resulting in substantially increasing the cost of the product to the end consumer. The disclosed cap also provides a solution for securing the settings of the date from being unintentionally changed.

The cap provides added value to existing medication containers, by allowing the consumer to easily track and monitor the expiration date of the medication therein and ensure that the consumer consumes safe and effective medication.

Figure 5:
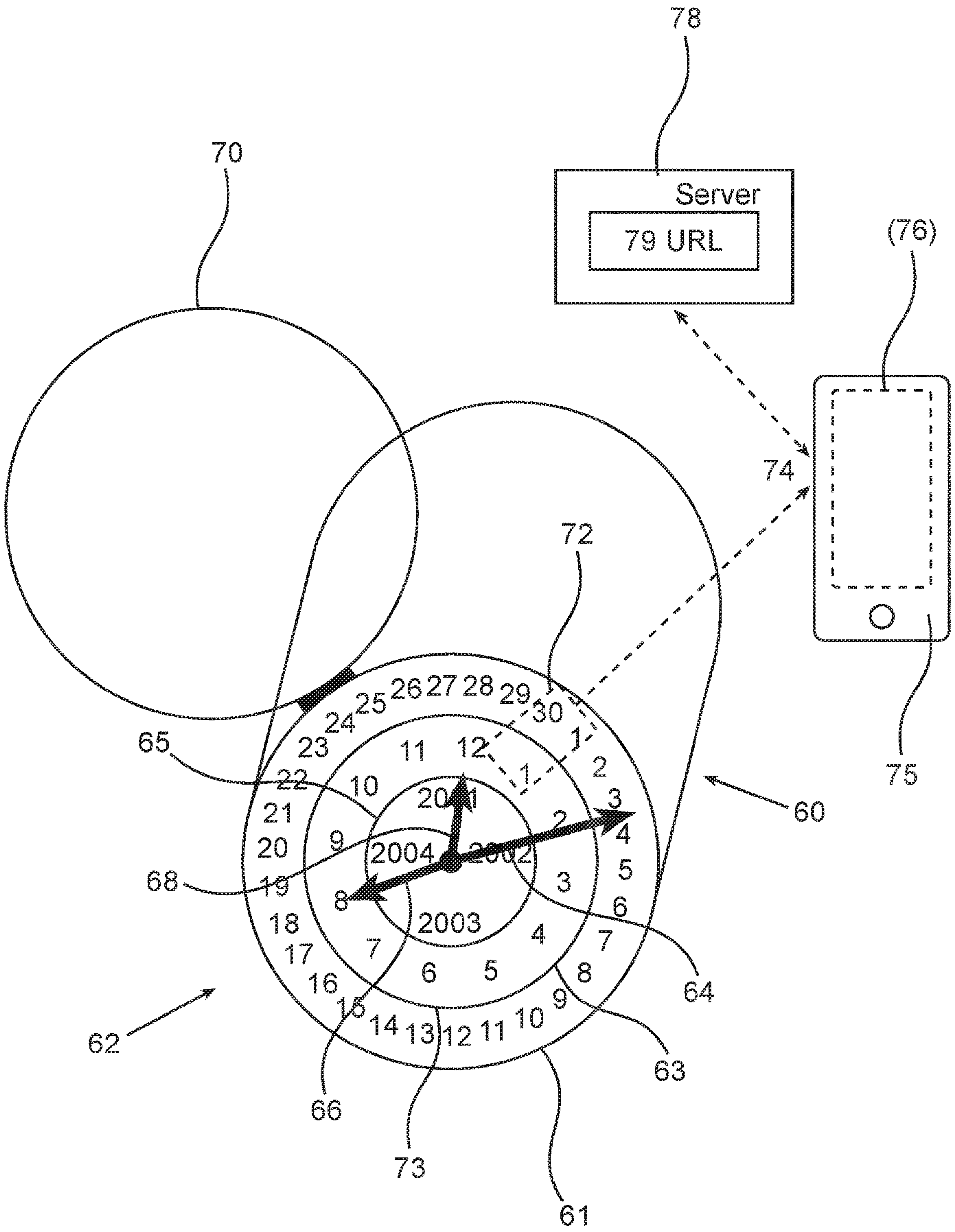
FIG. 5 is a schematic perspective view of a container in use with the proposed device. The figure also shows optional means for monitoring a date of interest by using an RFID tag.

It should also be noted that the proposed inventive device may form integral part of the item which the device serves, for example a container may be provided with the features described for the inventive cap. One example of such a container is shown in FIG. 5.

FIG. 1 illustrates one exemplary embodiment of the proposed device, the device is in the form of a cap 10. The cap 10 is designed to be compatible to some existing medication container and to replace its original cap. It should be kept in mind that the device 10 may constitute a cap cover mountable on a standard cap.

The date arrangement of the cap 10 comprises two rotatable dials in the form of discs 12 and 14 laying in two parallel planes and disposed between a front face 16 and a rear face 18 of the cap. The dials have icons in the form of digits which serve for setting a date of interest. A user sets the date by turning the dials 12 and 14 which have grooved rims. The front face 16 comprises a display area 17 consisting of two orifices 20 and 21 through which a user may see the underlying digits of the selected date of interest. The date is set and then kept for further monitoring. To this purpose, the front face 16 has a movable cover (lid) 22 with a locking element, for example a hook 24 which, when the lid is closed, is engaged within a recess 26, locks the lid and thus prevents further manipulations with the dials 12 and 14. It is understood that the hook 24 and the recess 26 may be positioned vice versa.

More dials may be placed in the cap 10, preferably in a horizontal position in order to exceed the original height of the original container cap as minimum as possible. According to some embodiments of the invention, the total height of the date arrangement may be of about 4 mm.

Figure 2A:
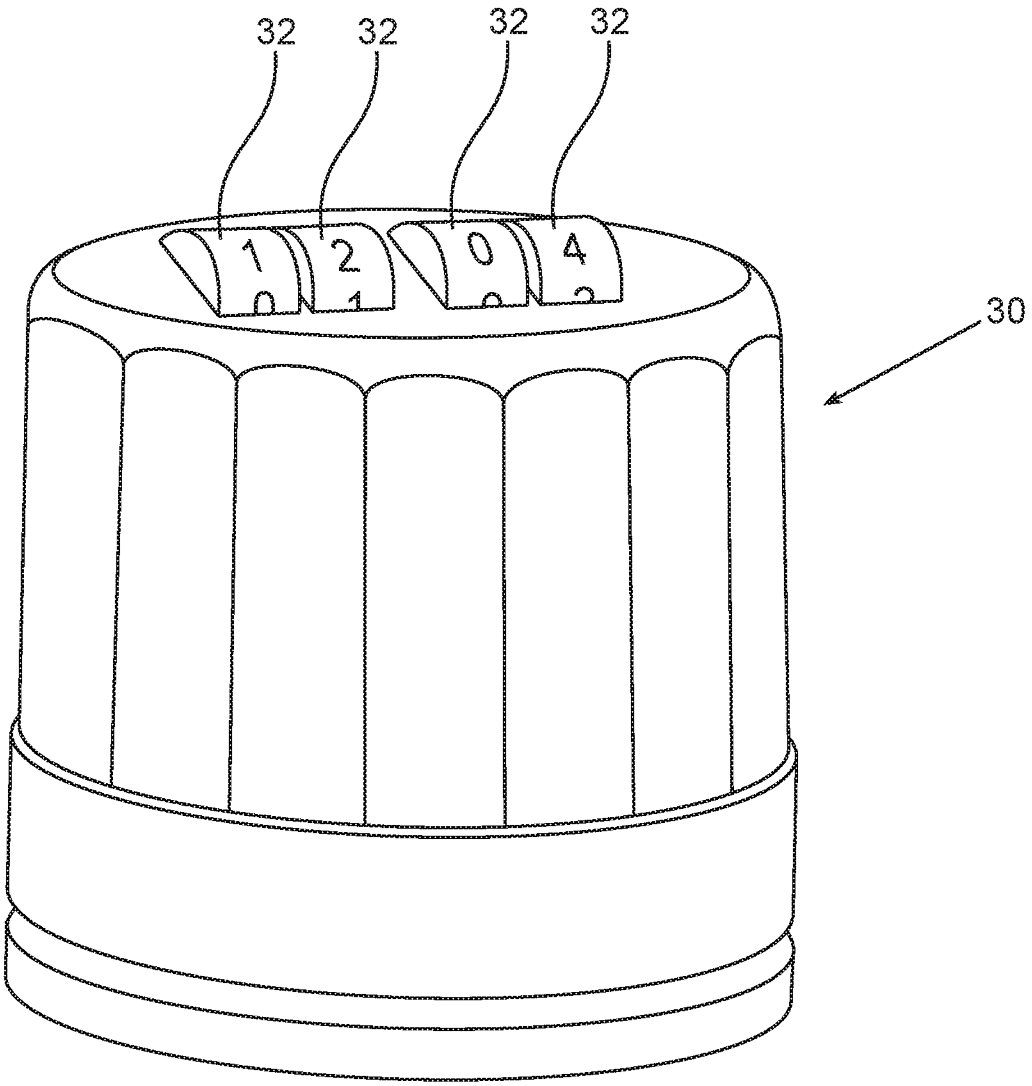
FIG. 2A is a schematic perspective view of the device according to some alternative exemplary embodiments of the invention.

FIG. 2A illustrates another embodiment 30 of the proposed device (cap or cap cover). The date arrangement comprises four dials 32 which may be discs or pulleys, for example may comprise tapes movable in a loop.

Each dial 32 allows easy movement thereof when force is applied thereto. Each dial sets a different part of the date—the first sets a number indicating the day and the second sets a number indicating the month. The third and the fourth pulley set a number indicating the year.

According to the embodiment of FIG. 2A, the set of pulleys is mounted on the top surface of the cap 30 in a vertical position. This configuration is preferred to be used when the top surface of the cap is relatively small, while its height is sufficient for the dials/pulleys.

The date arrangement shown in FIG. 2 may comprise at least one element for locking the dials 32, for example a clamp, a bracket, a transparent lid (not shown) being initially open, but ready for locking the dials from above when the date of interest is set.

Figure 2B:
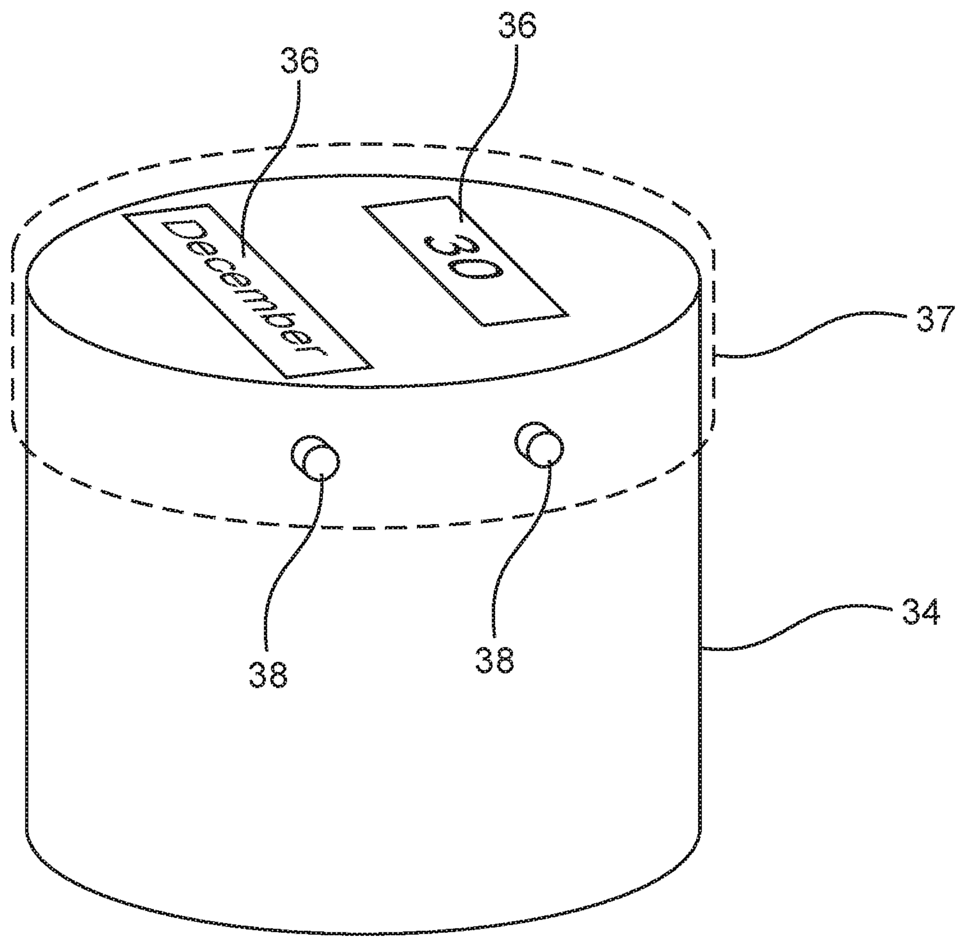
FIG. 2B is a perspective view of yet another alternative embodiment of the device.

The date arrangement of FIG. 2B illustrates yet another embodiment 34 of the device (cap/cap cover), namely an example of the implementation comprising digital displays 36, buttons/switches 38 for controlling the displays and a battery (not shown). Upon setting a desired date of interest at the displays 36, the date should be "frozen", i.e. any changes to the date should be prevented. That may be performed by permanently locking access to the buttons, for example by applying a long press on the buttons and/or by tightly mounting a transparent lid 37 on the cap, so that it will cover the date arrangement and permanently lock the buttons.

Figure 3A:
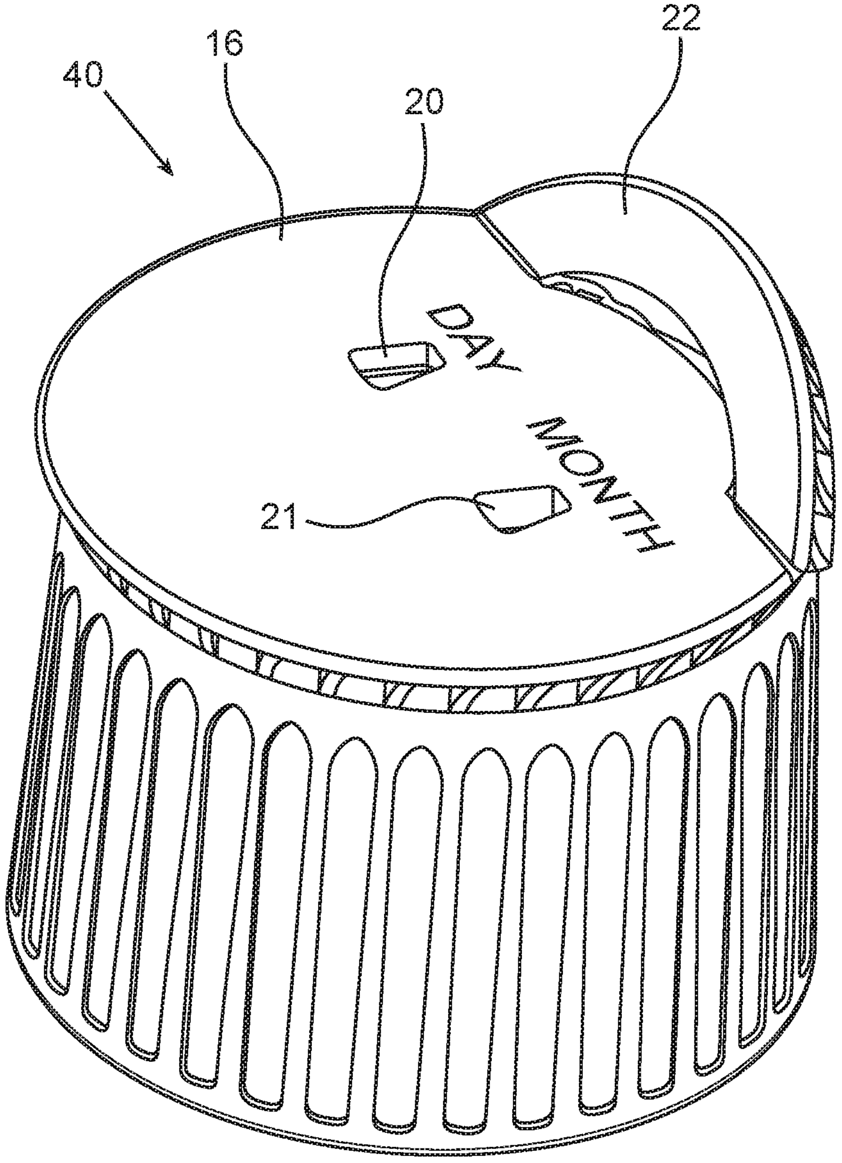
FIG. 3A is a perspective view to the front face of a further embodiment of the device, with a lid in its open position.

FIG. 3A is one perspective view of a further embodiment 40 of the proposed device (cap or cap cover). Similar numbers will be used for similar positions. A front face 16 has display orifices 20 ad 21 via which a user sees a selected date of interest. A lid 22 is a portion of the front face 16. Lid 22 is pivoted to the front face 16 and is shown in its open position.

Figure 3B:
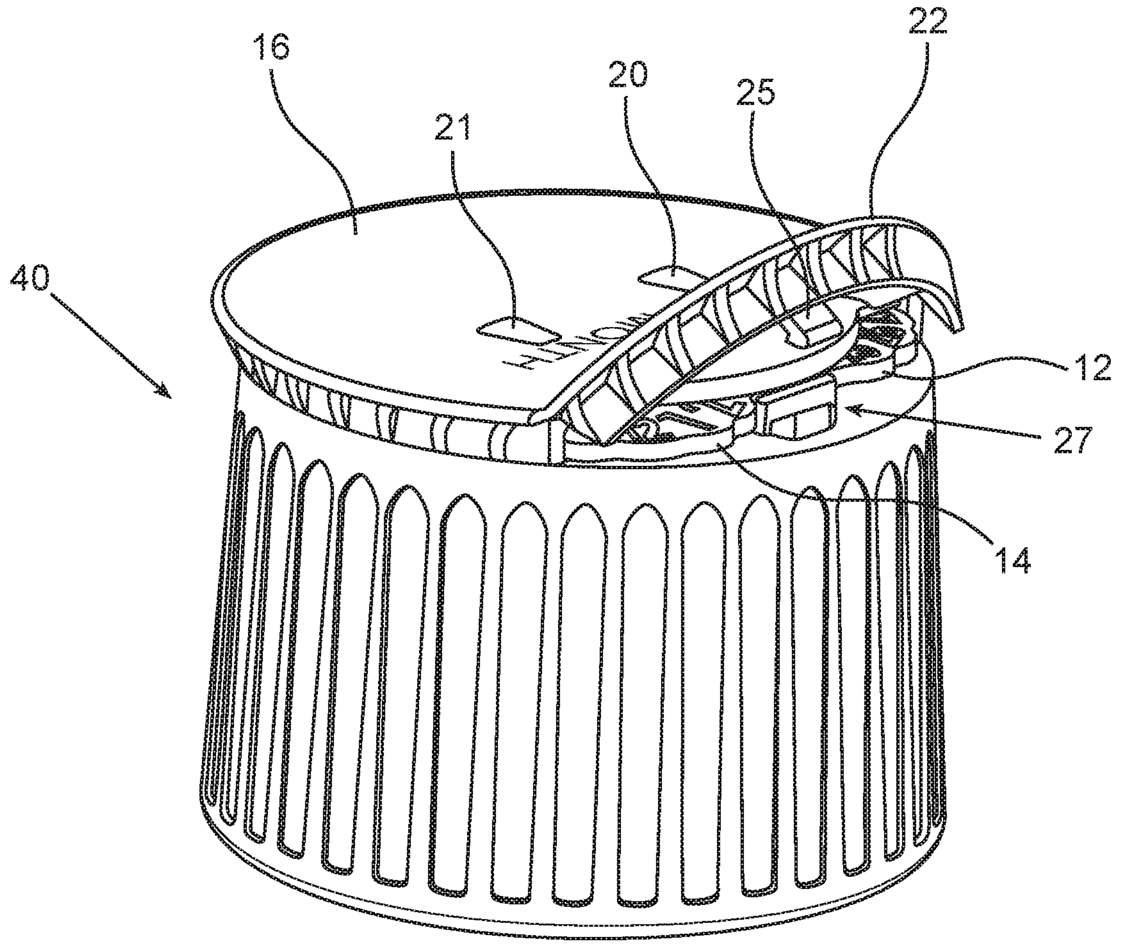
FIG. 3B is another perspective view of the device shown in FIG. 3A, showing the dials under the front face and a locking element on the lid.

FIG. 3B shows the two dials 12 and 14 laying in the same plain, and carrying on their upper surface icons (digits). When the lid 22 is open, the user has access to the dials 12 and 14 and may select a date of interest by rotating the dials and bringing suitable numbers under the respective orifices 20 and 21.

The lid 22 is provided with a locking element (hook) 25. When the lid 22 is in its closed position, the element 25 enters a recess 27. It may be further clamped there-inside and block the dials 12 and 14 at their places (the hook 25 may be additionally caught between "teeth" of the dials). The main function of the lid 22 is a) to allow access to the dials 12, 14 when needed, and b) when the date of interest is set, to cover the dials and permanently lock the access by the element 25.

Figure 3C:
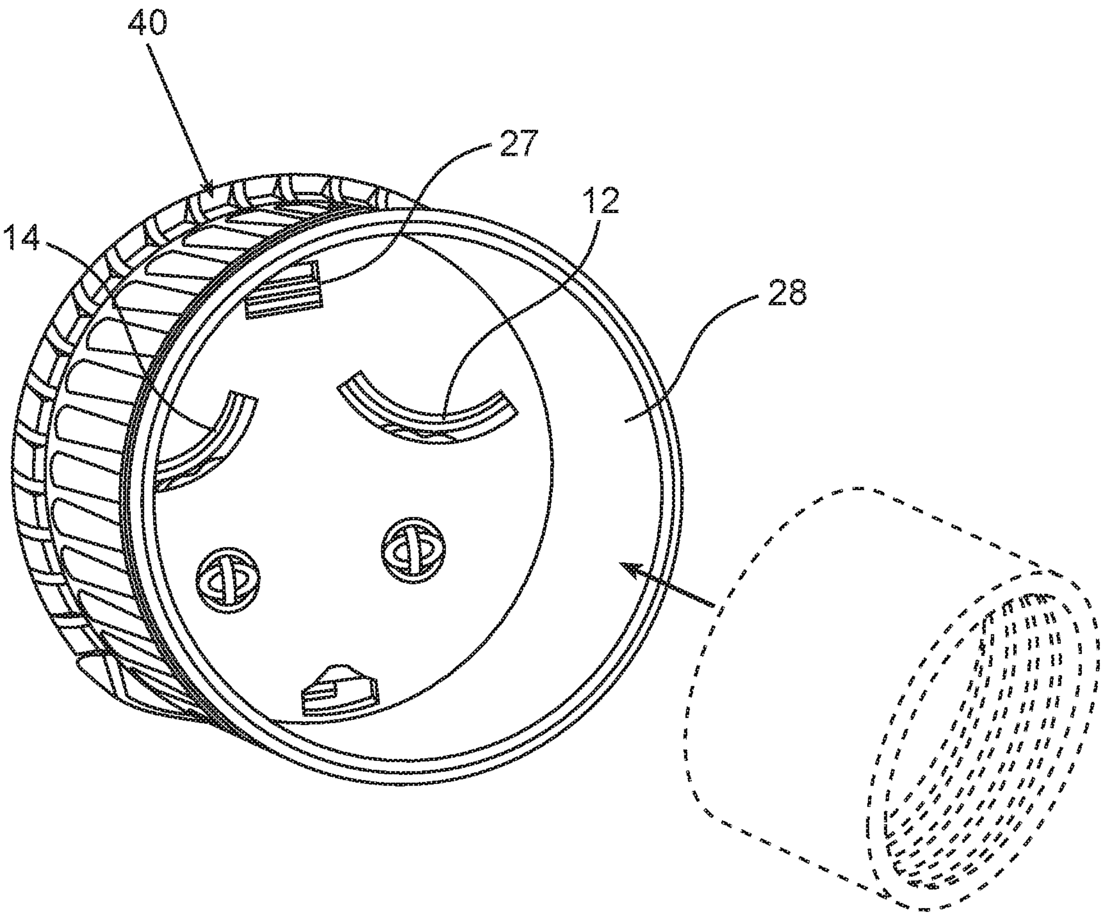
FIG. 3C is a perspective view from the rear face of the device shown in FIGS. 3A and 3B.

FIG. 3C shows the cap 40 from its the rear side while the rear face (not shown) is removed. In the drawing, one can see location of the dials 12, 14 and the recess 27 via corresponding slots. When in place, the rear plate protects the device from direct contact with the product/the cap.

In practice, a so-called inner cap (schematically shown by a dotted contour with an arrow) may be used instead of the rear face. The inner cap is provided with engaging means and is responsible for engaging a standard (or the proposed) cap with a bottle/container. In our case, the inner cap would create tight contact with the rear surface and the inner peripheral walls 28 of the cap 40.

Figure 4A:
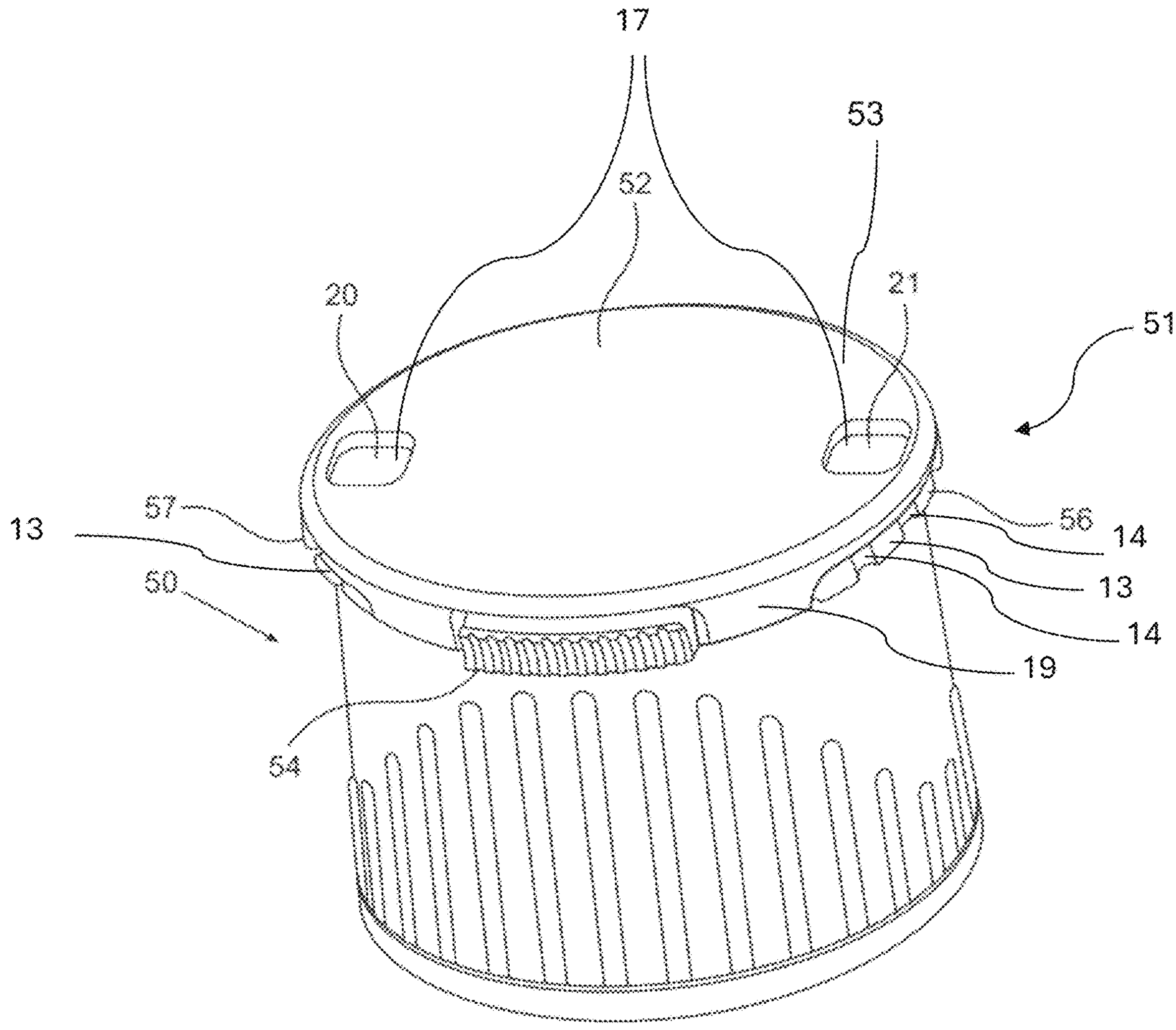
FIG. 4A is a perspective view to the front face of another exemplary embodiment of the device.

FIG. 4A shows yet another embodiment 50 of the proposed cap (cap cover), where the whole front face 53 constitutes a stationary lid 52 further comprising a rear face 18 (seen in FIG. 4B), and peripheral side walls 19 extending therebetween. The locking element is shown as 54. It is pressable to lock two dials 56, 57, when needed. In this embodiment, the display orifices 20 and 21 are positioned closer to the rim, to display digits (not shown) on the dials 56, 57.

FIG. 4A shows the dials (discs) 56 and 57 which extend from the footprint (contour) 51 of peripheral walls 19 of the cap, for accessing them without opening the lid. They are both provided with a grooved rim 13 having grooves 14 to allow easy rotation of the discs when force is applied thereto. Each disc sets a different part of the date—the first disc sets a number indicating the day and the second disc sets a number indicating the month. In other embodiments of the invention, a third disc may be provided, which sets a number indicating the year. (Obviously, the two discs may be used for indication of the month and the year.)

Figure 4B:
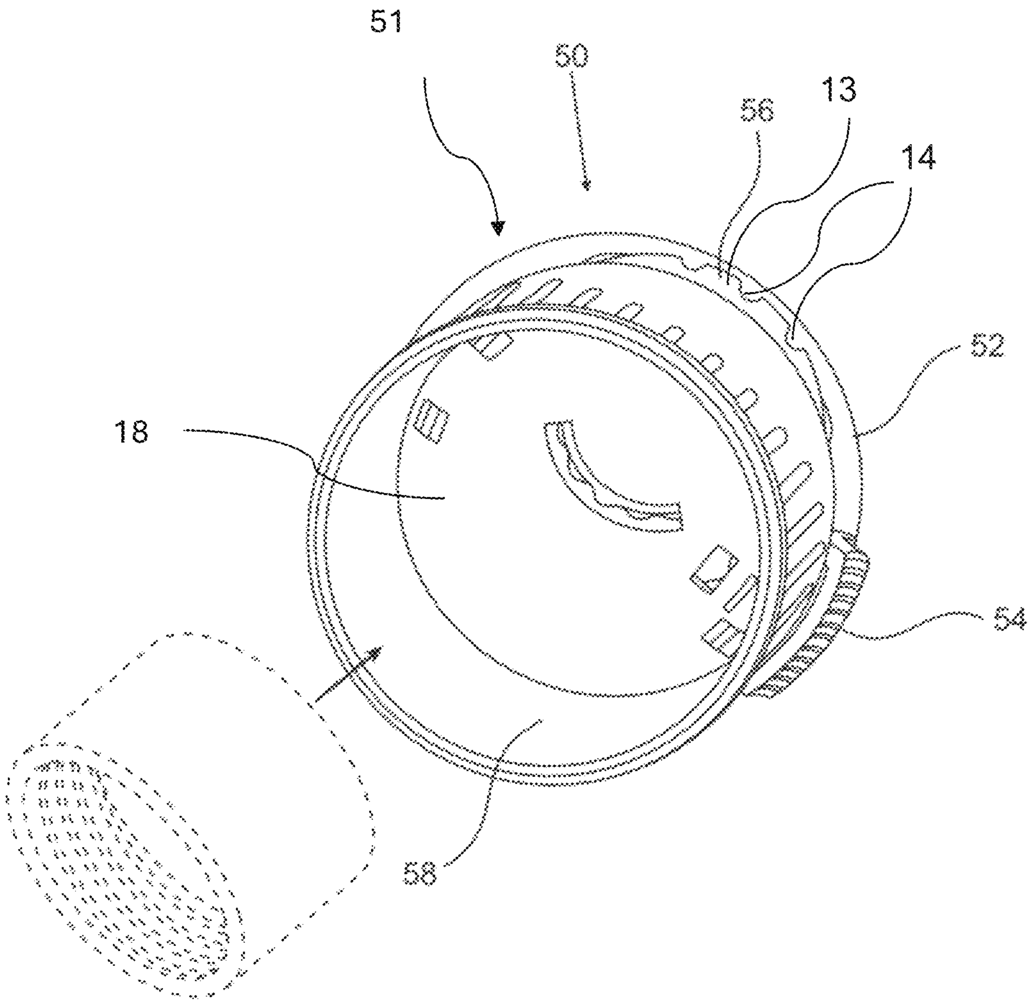
FIG. 4B is a perspective view from the rear face of the device shown in FIG. 4A.

FIG. 4B shows the embodiment of FIG. 4A from the rear side thereof. One may note that the dials (only 56 is seen) sufficiently extend from the peripheral walls 19, so they may be rotated even from outside. When the date of interest is set, the user may lock it by pressing the locking element 54 inwards. Means (not shown) for securing the device to a container/a cap may be placed on the inner peripheral wall 58. The means may comprise a rear face/plate covering the rear side of the cap 50. Alternatively, an internal cap (schematically shown by a dotted contour with an arrow) may be tightly inserted inside the cap 50. The internal cap may be standard and may carry engaging means for coupling the cap 50 to a suitable bottle neck.

In some embodiments of the invention, the proposed device with date arrangement may comprise at least one button, switch (bracket, clamp, scotch cover or any other suitable element designed to lock the date settings), ensuring the date settings are secured and not mistakenly or accidentally changed. Optionally, a suitable mechanism also may be used to secure the date settings in a way that only if the consumer intentionality wishes to change said date settings, he would be able to do so by correctly operating said mechanism.

FIG. 5 schematically illustrates yet another embodiment of the invention, being a container which implements the features of the proposed inventive device. Let the container 60 is a can for medication or cosmetics. The date arrangement 62 may be placed on the bottom of the can and can be used for setting a date of interest, for example, the expiry date of the cosmetics after opening the can. This date arrangement 62 comprises three concentric discs (61, 63, 65) having digits on their surfaces, and an assembly of clock hands (in this case, 64, 66, 68). A transparent upper face 70 serves as a lid which is configured to cover the arrangement 62 and to fix the date after it is set and the lid 70 is locked on the arrangement 62. The lid 70 may be pivoted to the assembly 60, or may be provided separately. The main function of the lid 70 is to protect the dials 61, 63, 65 and/or the hands 64, 66, 68 from being moved after the date of interest is set.

The arrangement 62 may be implemented in one of two alternative manners a) or b), using relative movement of the dials and the clock hands:

a) the discs 61, 63, 65 are rotatable by a user's finger, the clock hands 64, 66, 68 are static. In this embodiment the discs serve as dials, and the clock hands serve as a display area (means).

b) The discs 61, 63, 65 are static and may be even manufactured as one integral piece carrying three concentric paths of digits, where each path has its own set of digits. The clock hands 64, 66, 68 are independently rotatable and serve as dials in this case. The discs will serve the display area in this case.

Alternatively or in addition to lid 70, the function of the upper face and the locking element can be fulfilled by a transparent scotch tape cover (not shown) which may be placed on the arrangement 62 upon the date of interest is set.

In addition to any implementation of the date arrangement described and illustrated in this patent application, the device may be provided with an RFID/NFC circuit. One example of such a circuit comprising an RFID tag 72 is illustrated in FIG. 5.

In FIG. 5, the RFID (NFC) circuit added to the can 60 is shown by dashed lines. According to the invention, the circuit comprises at least an RFID tag 72 which is characterized by its ID and also by a specific data on the product stored in the can 60. For example, the specific data may comprise info/indication that the RFID tag is intended for Neurophen. Further, the info may teach how to determine the expiration date for the Neurophen after opening the container.

The tag 72 can be placed anywhere on the can, for example under the arrangement 62.

An RFID (NFC) reader 74 may be provided separately, but may be incorporated in a modern smart phone 75.

Let the user opens the container 60 and then sets the expiration date and/or the opening date mechanically, by turning the dials.

In addition, the user may perform the following process with the aid of the RFID tag 72, for example in order to provide for himself/herself a computerized reminder.

We keep in mind that the tag 72 is provided with an indication of a specific medication for which the tag is intended (manufactured).

When bringing the phone 75 close to the RFID tag, the reader 74 will identify the tag 72 and will detect this moment of time as the initiation date of the tag 72. The initiation date will indicate the date when the medication container 60 was opened.

The information about opening a container with the RFID tag 72 will be sent by the RFID reader 74 to a server 78 where, owing to a specific software script (software code) 79, a webpage/URL link will be created. The script will calculate and register at the URL one or more dates of interest (say, the expiration date of Neurophen in the can opened at a specific date). The expiration date will be recorded for the tag's 72 ID, i.e. will be associated with the type of medication registered in that tag 72 and with the opening date of the container where the tag 72 is placed.

A copy of the link (i.e. all the relevant data stored at the URL) may be communicated from the server 78 to a calendar computer application 76 which may be installed in the same smartphone 74 or in any other computer device of the user.

In other words, at least one date relevant to the specified medication or cosmetics may be registered with reference to the can 60 (for example related to its opening date), and this information will be associated with the ID number of the RFID (NFC) tag 72 and the specific product for which the tag was manufactured. Additional data may be provided in the tag 72, for example on the place where the item (container) was sold, its barcode, etc.

Having described the invention with regard to certain specific embodiments thereof, it is to be understood that the description is not meant as a limitation, as further modifications will now become apparent to those skilled in the art, so that the description and the claims which follow are intended to cover such modifications.

The invention claimed is:

1. A replacing cap for use with an existing medication container having an original cap of predetermined size and dimensions, the medication having an expiration date; the replacing cap having the same size and dimensions as the original cap and comprising:

- a stationary lid having a front face configured to face a user, a rear face opposite thereto, and a peripheral side wall therebetween;
- a display area on the front face in the form of two orifices configured to display two icons thereat;
- only two dials disposed between the front face and the rear face of the lid, having icons thereon in the form of digits facing in the direction of orifices, and serving for setting the day and the month of a date of interest; the dials having grooved rims to allow easy rotation of the dials so as to bring the icons successively into a position at said display area, the dials being accessible to the user for applying said force thereto in order to perform setting of the date of interest, using the display area;
- a single locking element located at the peripheral side wall so as to be pressable inwards to engage said two dials so as to permanently prevent the movement thereof in order to preserve the performed setting of said date of interest;
- wherein the locking element has an unlocking position, at which said dials are allowed to move, and a locking position, at which at least a portion of the locking element engages the dials, and wherein, in the locking position of the locking element, an exterior surface thereof is disposed within boundaries of a footprint of the device.

2. The device according to claim 1, wherein each of said dials is in the form of a disc rotatable when the force is applied thereto.

3. The device according to claim 1, wherein each of said dials has grooves configured to receive at least a portion of said locking element therein so as to engage said at least a portion to prevent the at least one dial from movement.

4. The device according to claim 1, wherein one of said dials defines a first plane, and the second dial defines a second plane different from the first plane.

5. The device of claim 4 wherein said first plane is parallel to the second plane.

6. A replacing cap for use with an existing medication container having an original cap of predetermined size and dimensions, the medication having an expiration date; the replacing cap having the same size and dimensions as the original cap and comprising:

- a stationary lid having a front face configured to face a user, a rear face opposite thereto, and a peripheral side wall therebetween;
- a display area on the front face in the form of two orifices configured to display two icons thereat;
- only two dials disposed between the front face and the rear face of the lid, having icons thereon in the form of digits facing in the direction of orifices, and serving for setting the day and the month of a date of interest; the dials having grooved rims to allow easy rotation of the dials so as to bring the icons successively into a position at said display area, the dials being accessible to the user for applying said force thereto in order to perform setting of the date of interest, using the display area;
- a single locking element located at the peripheral side wall so as to be pressable inwards to engage said two dials so as to permanently prevent the movement thereof in order to preserve the performed setting of said date of interest; wherein the locking element has an unlocking position, at which said dials are allowed to move, and a locking position, at which at least a portion of the locking element engages the dials.

7. The device according to claim 6, wherein each of said dials is in the form of a disc rotatable when the force is applied thereto.

8. The device according to claim 6, wherein in the locking position of the at least one locking element, an exterior surface thereof is disposed within boundaries of a footprint of the device.

9. The device according to claim 6, wherein each of said dials has grooves configured to receive at least a portion of said locking element therein so as to engage said at least a portion to prevent the at least one dial from movement.

10. The device according to claim 6, wherein one of said dials defines a first plane, and the second dial defines a second plane different from the first plane.

11. The device of claim 10 wherein said first plane is parallel to the second plane.

* * * * *